United States Patent
Lee et al.

(10) Patent No.: US 11,669,474 B1
(45) Date of Patent: Jun. 6, 2023

(54) BUS PIPELINE STRUCTURE FOR DIE-TO-DIE INTERCONNECT AND CHIP

(71) Applicant: Chiplego Technology (Shanghai) Co., Ltd, Shanghai (CN)

(72) Inventors: Sheau Jiung Lee, Shanghai (CN); Hongyu Zhang, Shanghai (CN)

(73) Assignee: Chiplego Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/956,239

(22) Filed: Sep. 29, 2022

(51) Int. Cl.
*G06F 3/00* (2006.01)
*G06F 13/362* (2006.01)
*G06F 1/10* (2006.01)

(52) U.S. Cl.
CPC ............ *G06F 13/3625* (2013.01); *G06F 1/10* (2013.01)

(58) Field of Classification Search
CPC ................................ G06F 13/3625; G06F 1/10
See application file for complete search history.

(56) References Cited

U.S. PATENT DOCUMENTS

2018/0101502 A1* 4/2018 Nassif ...................... G06F 1/04
2022/0342841 A1* 10/2022 Choudhary ......... G06F 11/1004

* cited by examiner

*Primary Examiner* — Henry Tsai
*Assistant Examiner* — Kim T Huynh
(74) *Attorney, Agent, or Firm* — Kim IP Law Group LLC

(57) ABSTRACT

A bus pipeline structure comprises: an n-channel multiplexer at a transmitting end works in an n times of clock domain of a transmitting chiplet; the n-channel multiplexer sends a data flow from the transmitting chiplet to an n-channel de-multiplexer at a receiving end, the n-channel de-multiplexer inputs the received data flow into a first register in an idle state among at least two registers at the receiving end, the first register outputs the received data flow to a receiving chiplet; after a receiving state machine at the receiving end determines that the n-channel de-multiplexer sends the received data flow to the first register, the receiving state machine at the receiving end sends a bus release flag to a transmitting state machine at the transmitting end, and the transmitting state machine receiving the bus release flag controls an n-channel multiplexer to transmit the data flow in a next clock cycle.

18 Claims, 6 Drawing Sheets

BUS PIPELINE STRUCTURE FOR DIE-TO-DIE INTERCONNECT AND CHIP

CROSS-REFERENCE TO RELATED APPLICATION(S)

This application claims priority to Chinese Patent Application No. 2022109007975 filed Jul. 28, 2022, the entire disclosure of which is incorporated herein by reference in its entirety.

TECHNICAL FIELD

Embodiments of the present disclosure relate to chip technology and in particular, to a bus pipeline structure for a die-to-die interconnect and a chip.

BACKGROUND

Chiplet system-on-chip (SOC) is the latest evolution of chip design techniques in a post-Moore's law world. Chiplet techniques both reduce the manufacturing cost and scale up the computing performance by using multiple smaller chiplets.

Performance gains of chips designed based on chiplets depend on the die-to-die interconnection design for multiple chiplets. A parallel bus die-to-die connection is the primary choice. It connects the bus protocol pin by pin through the cross-chip flip-flop circuits. It offers the shortest latency between two dies. It also scales up the bandwidth by increasing the bus width. However, the downside of the parallel interconnect is increased manufacturing cost. The bump pitch of chiplet interconnect consumes more silicon area than bus interconnects inside the chip.

For instance, the bump pitch of an organic substrate package is about 150 μm, the bump pitch of integrated fan-out (InFO) package is about 40 μm, and the bus pitch on silicon is less than 0.1 μm. Let's examine a 128 bits Advanced eXtensible Interface (AXI) bus with AXI coherency extensions (ACE) bus snooping as an example. It requires a total of about 600 input/output (IO) signals for one direction, chiplet to chiplet. If there is a need of another direction, it will require another set of 600 IO signals. It takes about 1200 IO signals for bidirectional communication through AXI/ACE bus. On the silicon, 1200 IO signals consume 120 μm wide silicon. The InFO package requires 24 mm wide silicon by a double row bump arrangement. The organic substrate package requires 90 mm wide silicon by a double row bump arrangement or 22.5 mm wide silicon by an 8 row-bump arrangement. More rows are added for bump, the greater the degradation of electrical characteristics of the die-to-die interconnect. The parallel bus die-to-die interconnect cannot support a greater performance scaling by increasing the number of chiplets due to requisite increase of bus IO signals.

SUMMARY

The present disclosure provides a bus pipeline structure for a die-to-die interconnect and a chip, so as to achieve the high effective bandwidth between chiplets using a smaller actual bit width and avoid high latency.

In a first aspect, an embodiment of the present disclosure provides a bus pipeline structure for a die-to-die interconnect. The bus pipeline structure for a die-to-die interconnect includes a transmitting end and a receiving end.

The transmitting end includes a transmitting state machine and an n-channel multiplexer, and the receiving end includes an n-channel de-multiplexer, at least two registers and a receiving state machine, where n is greater than or equal to 2, and the n-channel multiplexer is connected with the n-channel de-multiplexer.

The transmitting state machine is connected with a transmitting bus of a transmitting chiplet and works in a clock domain of the transmitting chiplet, the n-channel multiplexer works in an n times of clock domain of the transmitting chiplet, the receiving state machine is connected with a receiving bus of a receiving chiplet, and the receiving end works in a clock domain of the receiving chiplet.

The transmitting state machine is configured to control the n-channel multiplexer to transmit a data flow from the transmitting chiplet to the n-channel de-multiplexer, the n-channel de-multiplexer is configured to input the received data flow into a first register in an idle state among the at least two registers, and the first register is configured to output the received data flow to the receiving chiplet through the receiving state machine.

After the receiving state machine confirms that the n-channel de-multiplexer transmits the received data flow to the first register, the receiving state machine is configured to transmit a bus release flag to the transmitting state machine, and the transmitting state machine receiving the bus release flag is configured to control the n-channel multiplexer to transmit the data flow from the transmitting chiplet to the n-channel de-multiplexer in a next clock cycle.

In a possible implementation of the first aspect, the receiving state machine is configured to transmit the bus release flag to the transmitting state machine through a side band bus.

In a possible implementation of the first aspect, the receiving state machine is also used for transmitting a stall flag to the transmitting state machine when the at least two registers are in a non-idle state, and the transmitting state machine is configured to stop transmitting the data flow from the transmitting chiplet through the n-channel multiplexer after the transmitting state machine receives the stall flag.

In a possible implementation of the first aspect, the receiving state machine is specifically used for transmitting the stall flag to the transmitting state machine through the side band bus when the at least two registers are in the non-idle state.

In a possible implementation of the first aspect, each of the transmitting bus, the receiving bus and the side band bus is a data bus or a command/address bus.

In a possible implementation of the first aspect, each of the transmitting bus, the receiving bus and the side band bus is a data bus and a command/address bus.

A data transmitting bus of the transmitting chiplet is connected with a data receiving bus of the receiving chiplet through the bus pipeline structure, and a transmitting command/address bus of the transmitting chiplet is connected with a receiving command/address bus of the receiving chiplet through the bus pipeline structure.

In a possible implementation of the first aspect, after the transmitting state machine of the bus pipeline structure through which the data transmitting bus of the transmitting chiplet is connected with the data receiving bus of the receiving chiplet receives the stall flag, the transmitting state machine of the bus pipeline structure through which the data transmitting bus of the transmitting chiplet is connected with the data receiving bus of the receiving chiplet transmits the stall flag to the transmitting state machine of the bus pipeline structure through which the transmitting command/address bus of the transmitting chiplet is connected with the receiving command/address bus of the receiving chiplet.

In a possible implementation of the first aspect, a bit width of the n-channel multiplexer and a bit width of the n-channel de-multiplexer are both m, and m×n is greater than or equal to a length of a data flow transmitted by the transmitting bus of the transmitting chiplet to the receiving bus of the receiving chiplet in one clock cycle.

In a possible implementation of the first aspect, the at least two registers are first in, first out (FIFO) registers.

In a possible implementation of the first aspect, the n-channel multiplexer works in an n/2 times of clock domain of the transmitting chiplet, and the n-channel multiplexer adopts double clock data strobe processing.

In a second aspect, an embodiment of the present application provides a chip. The chip includes at least two chiplets, where any two of the at least two chiplets are connected through the bus pipeline structure for a die-to-die interconnect in any possible implementation of the first aspect.

In the bus pipeline structure for a die-to-die interconnect and the chip provided by embodiments of the present disclosure, multiplexer and de-multiplexer pairs are used to transmit data between chiplets so that the bus pipeline interconnect structure between chiplets is achieved, thereby achieving the high effective bandwidth between chiplets using a smaller actual bit width and avoiding high latency.

DETAILED DESCRIPTION

Figure 1:
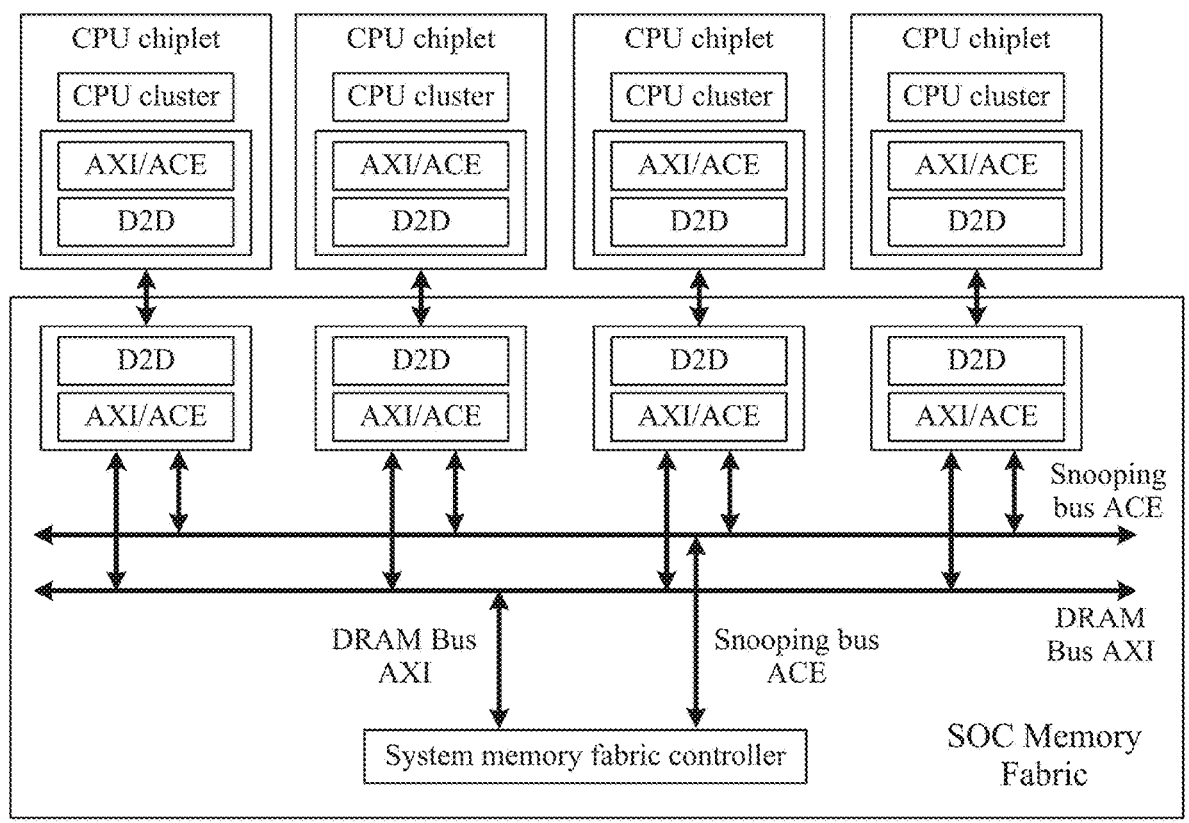
FIG. 1 is a schematic diagram of a user scenario to scale the computing performance through multiple chiplet interconnects.

The present disclosure is further described hereinafter in detail in conjunction with drawings and embodiments. It is to be understood that the embodiments described herein are intended to explain the present disclosure and not to limit the present disclosure. Additionally, it is to be noted that for ease of description, only part, not all, of the structures related to the present disclosure are illustrated in the drawings.

In order to solve the parallel bus connection problem for the interconnect among chiplets, one technique is the use of multiple n-channel multiplexer and de-multiplexer pairs to reduce the required number of IO signals in the die-to-die interconnects. The latest industry trend is the Universal chiplet interconnect express (UCIe). UCIe adopts the well-established I/O physical layer, die-to-die protocol and software stack from Peripheral Component Interconnect Express (PCIe). UCIe is capable of reducing the numbers of IO signals for chiplet interconnect but has the disadvantages of long latency and a lack of bus pipeline. These shortcomings prevent UCIe from becoming the choice for scaling the computing performance through the chiplet design.

FIG. 1 is a schematic diagram of a user scenario to scale the computing performance through multiple chiplet interconnects. FIG. 1 shows the design that four chaplets of multi-core central processing unit (CPU) clusters are connected to a system memory fabric controller. The object of the preceding design is to increase computing performance by four times. To scale the performance, the die-to-die (D2D) must replicate the AXI/ACE bus from the chiplet to the system memory fabric. There is a requirement for fast response and bus pipeline control through D2D. UCIe fails in the latency due to multiple layer protocol and packet format similar to PCIe/CXL (Compute Express Link). The long latency of D2D will cripple the dynamic random access memory (DRAM) bus AXI and the ACE snooping bus. The fixed payload of 2 Kbit in UCIe is different from the typical CPU cache line size of either 512 bit or 1 Kbit. This limitation of UCIe for fixed payload prevents the bus pipeline from being implemented. As a result, the memory master cycles could either overrun or underrun AXI/ACE cycle. The effective bandwidth can seriously degrade from its peak bandwidth of D2D when UCIe is used. This shows that a bus pipeline is required to support the variable size of data transfer. The bus pipeline can produce a high effective bandwidth even though the system fabric memory experience a long latency due to traffic collision of multiple memory masters.

The embodiments of the present application provide a bus pipeline structure for a die-to-die interconnect based on n-channel multiplexer and de-multiplexer pairs. The bus pipeline of die-to-die interconnect can sustain the effective bandwidth without bandwidth degradation even though the system memory fabric experiences a long latency due to the memory collision during a high memory.

Figure 2:
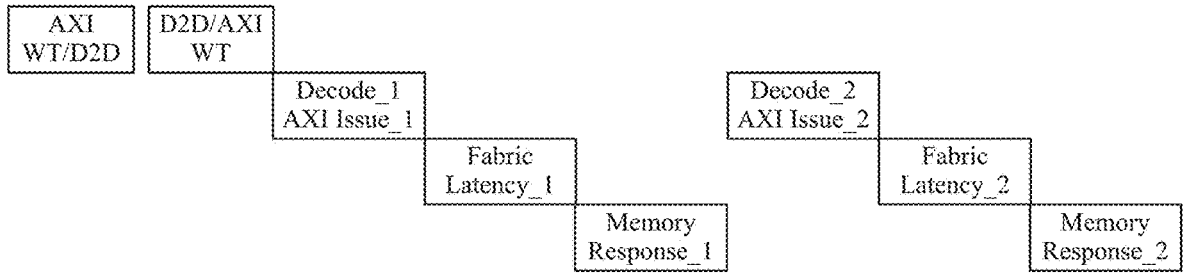
FIG. 2 is a structure diagram of a D2D interconnect without a bus pipeline and a D2D interconnect with a bus pipeline.
Figure 2:
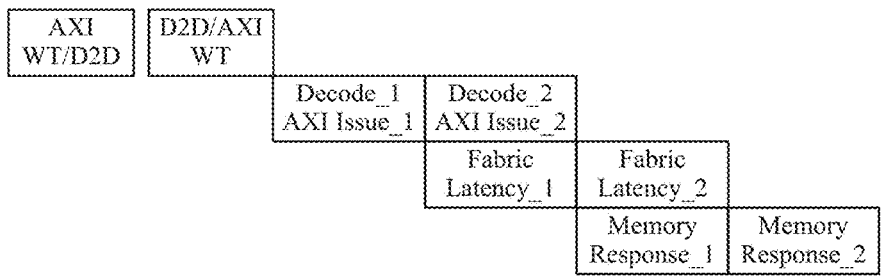

To implement the bus pipeline structure, two concurrent bus protocols are required. One is the command and address bus, and the other one is the data bus. The command/address bus has a narrower bus width than the data bus. The utilization of the bus is normally different between these two buses. The address/command bus is much less heavy than the data bus. The command/address bus is typically one bus cycle. The data bus is typical in multiple burst cycles, either in 4 burst cycles or 8 burst cycles, etc. The system memory fabric will input the address/command bus into the queue list of requests and may need different latency to process the memory request from the command/address bus according to its queue list. After certain latency, according to the memory request traffic from all memory masters, the system fabric will respond to the memory transfer on the data bus. It is important that the memory data bus needs to perform a high efficient operation through the bus pipeline. FIG. 2 is a structure diagram of a D2D interconnect without a bus pipeline and a D2D interconnect with a bus pipeline.

FIG. 2 shows a memory data bus efficiency between a D2D interconnect without a bus pipeline (Without Pipeline D2D) and a D2D interconnect with a bus pipeline (With Pipeline D2D). The AXI write (AXI WT) operation is taken as an example to illustrate FIG. 2. To write data to memory through one D2D interconnect pair, that is, through AXI WT/D2D and D2D/AXI WT, the data needs to be decoded firstly, be transmitted through the AXI bus (AXI issue), then experience system fabric latency and finally obtains a memory response. The D2D interconnect without a pipelining performs the bus cycle in sequence and thus decoding overhead and system memory fabric delay cannot be reduced. As shown in FIG. 2, for the D2D interconnect without a pipeline, in the first data transfer cycle, the D2D interconnect needs to perform decoding (Decode_1) and AXI issue (AXI issue_1), then experiences system fabric latency (Fabric Latency_1) and finally obtains a memory response (Memory Response_1). Only after the first data transfer cycle obtains the corresponding memory response can the data enter the second data transfer cycle. Then, in the second data transfer cycle, the D2D structure still needs to perform decoding (Decode_2) and AXI issue (AXI issue_2), then experiences the system fabric latency (Fabric Latency_2) and finally obtains a memory response (Memory Response_2). Obviously, the memory data bus suffers from the overhead of latency and decoding time. The effective bandwidth degrades in this D2D implementation. As shown in FIG. 2, for the D2D interconnect with a pipeline, in the first data transfer cycle, the D2D interconnect needs to perform decoding (Decode_1) and AXI issue (AXI issue_1), then experiences system fabric latency (Fabric Latency_1) and finally obtains a memory response (Memory Response_1), and the second transfer cycle may be carried out after decoding (Decode_1) and AXI issue (AXI issue_1) in the first data transfer cycle complete. As a result, in the D2D interconnect with a pipeline, the overhead of memory data bus decoding and the system fabric latency can be mitigated and a high effective bandwidth is generated.

One root cause of preventing a D2D from performing the bus pipeline is that the D2D uses a fixed packet format for the bus signal to transfer from the chiplet to the memory fabric or from the memory fabric to the chiplet. This prevents performing the concurrent address/command bus and data bus due to the nature of different bus bandwidths and latency. Another root cause is that the typical D2D bears a packet transmission latency and packet reception latency to support the operation of the D2D adapter layer and protocol layer in addition to the physical layer. Therefore, it is difficult to translate the AXI/ACE bus on the chiplet to AXI/ACE on the system memory fabric concurrently in the short latency.

Figure 3:
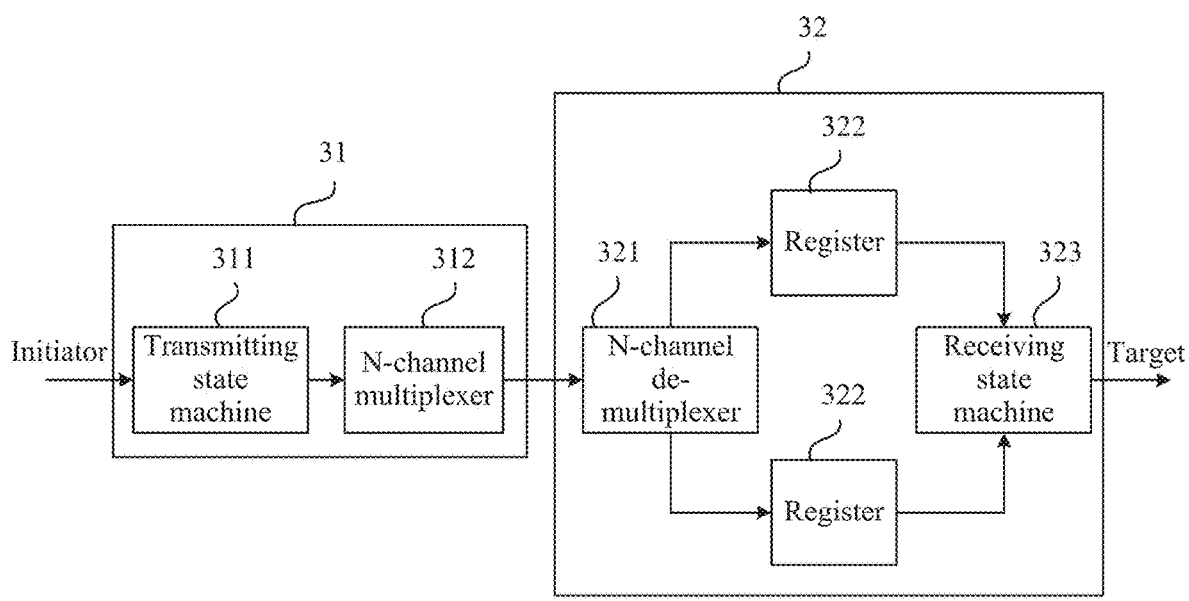
FIG. 3 is a structure diagram of a bus pipeline structure for a die-to-die interconnect according to an embodiment of the present application.

FIG. 3 is a structure diagram of a bus pipeline structure for a die-to-die interconnect according to an embodiment of the present application. As shown in FIG. 3, the bus pipeline structure for a die-to-die interconnect provided by this embodiment includes a transmitting end 31 and a receiving end 32.

The transmitting end 31 includes a transmitting state machine 311 and an n-channel multiplexer 312, and the receiving end 32 includes an n-channel de-multiplexer 321, at least two registers 322 and a transmitting state machine 323, where n is greater than or equal to 2, and the n-channel multiplexer 312 is connected with the n-channel de-multiplexer 321.

The bus pipeline structure for a chiplet-to-chiplet interconnect provided by this embodiment provides an intra-chip die-to-die (D2D) interconnect based on chiplet architecture, where the die may be an independent part that can achieve any function within the chip, such as a chiplet with any structure, a system memory fabric, SOC, etc.

Figure 4:
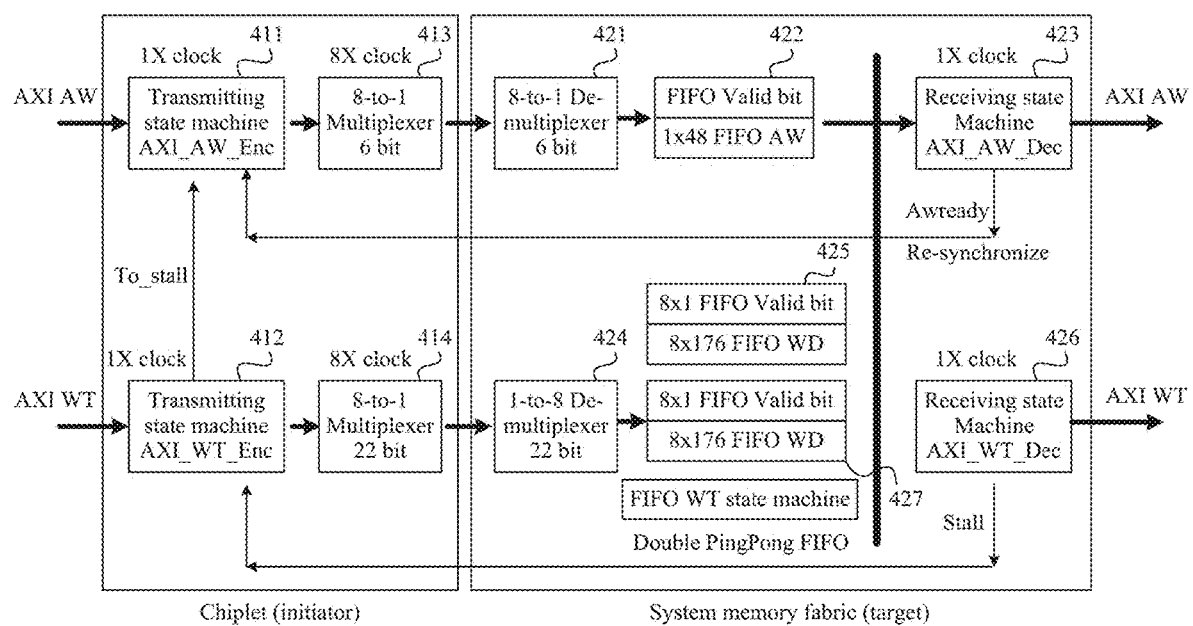
FIG. 4 is a structure diagram of another bus pipeline structure for a die-to-die interconnect according to an embodiment of the present application.

FIG. 3 illustrates a bus pipeline structure for a die-to-die interconnect according to an embodiment of the present application. To further illustrate the principle and functions of the bus pipeline structure for a die-to-die interconnect provided by this embodiment of the present application, the bus pipeline structure for a die-to-die interconnect provided by this embodiment of the present application is described in detail using a bus pipeline structure for a die-to-die interconnect shown in FIG. 4 as an example. FIG. 4 is a structure diagram of another bus pipeline structure for a die-to-die interconnect according to an embodiment of the present application.

In FIG. 4, a chiplet serving as an initiator is a chiplet of any structure, a chiplet serving as a target is a system memory fabric, and the target transmits both the data flow of an AXI write data bus (AXT WT) and the data flow of an AXI write address/command bus (AXI AW) in the transmitting direction. It is to be noted that the bus pipeline structure for a die-to-die interconnect provided by this embodiment may be a bus pipeline structure for transmitting one data flow between the initiator and the target.

The transmitting state machine 411 (AXI_AW_Enc) is connected with the transmitting bus AXI AW of the transmitting chiplet, the transmitting state machine 412 (AXI_W-T_Enc) is connected with the transmitting bus AXI WT of the transmitting chiplet, and both the transmitting state machine 411 and the transmitting state machine 412 work in the clock domain 1× clock) of the transmitting chiplet. The 8-to-1 multiplexer 413 works in the n times of clock domain of the transmitting chiplet (8× clock is taken as an example in the figure), and the 8-to-1 multiplexer 414 works in the 8× clock domain of the transmitting chiplet. The receiving state machine 423 (AXI_AW_Dec) is connected with the receiving bus AXI AW of the receiving chiplet, the receiving state machine 426 (AXI_WT_Dec) is connected with the receiving bus AXI WT of the receiving chiplet, and the receiving end works in the clock domain of the receiving chiplet (the 1-to-8 de-multiplexer 421, the 1-to-8 de-multiplexer 424, two registers 422, the register 425, the receiving state machine 423 and the receiving state machine 426 all work in the clock domain of the receiving chiplet, i.e., in 1× clock).

The transmitting state machine 411 controls the 8-to-1 multiplexer 413 to transmit a data flow from the transmitting chiplet to the 8-to-1 de-multiplexer 421, the 8-to-1 de-multiplexer 421 inputs the received data flow into a first register 422 in an idle state among the at least two registers 422 (only one register 422 is shown in the figure), and the first register 422 outputs the received data flow to the receiving chiplet through the receiving state machine 423. For the address/command bus (AXI AW), since the amount of data per cycle is small, the number of registers 422 may be one.

After the receiving state machine 423 confirms that the 8-to-1 de-multiplexer 421 transmits the received data flow to the first register 422, the receiving state machine 423 transmits a bus release flag (Aweady) to the transmitting state machine 411, and the transmitting state machine 411 receiving the bus release flag controls the 8-to-1 multiplexer 413 to transmit the data flow from the transmitting chiplet to the 8-to-1 de-multiplexer 421 in a next clock cycle.

Since the 8-to-1 multiplexer 413 works in the 8× clock domain of the transmitting chiplet, the 8-to-1 multiplexer 413 can transmit data 8 times the bit width of the 8-to-1 multiplexer 413 in one clock cycle of the transmitting chiplet. The 8-to-1 multiplexer 413 and the 8-to-1 de-multiplexer 421 in the bus pipeline structure are a pair and have the same number of multiplexing paths. A pair of the 8-to-1 multiplexer 413 and the 8-to-1 de-multiplexer 421 can achieve the transfer on the address/command bus in one clock cycle. The 8-to-1 multiplexer 413 and the 8-to-1 de-multiplexer 421 have the same bit width, and the bit width is determined according to the length of the data flow to be transmitted. Specifically, the bit widths of a pair of the n-channel multiplexer and the n-channel de-multiplexer are m, and m×n is greater than or equal to the length of a data flow transmitted by the transmitting bus of the transmitting chiplet to the receiving bus of the receiving chiplet in one clock cycle. For example, when the AXI AW bus needs to transfer 48-bit data in one clock cycle, a 6-bit wide 8-to-1 multiplexer 413 may be used in the initiator, and accordingly, a 6-bit wide 1-to-8 de-multiplexer 421 may be used in the target. Therefore, the transfer of a data flow from the initiator to the target in one clock cycle can be achieved, whereas the bit width of the 8-to-1 multiplexer 413 and the 1-to-8 de-multiplexer 421 is only 6 bits, that is, the transfer of a 48-bit data flow can be achieved using only the bit width of 6 bits. After the 1-to-8 de-multiplexer 421 receives the data flow, the 1-to-8 de-multiplexer 421 needs to write the data flow to the first register 422 first. Since the first register 422 works in the clock domain of the target, the first register 422 may transmit the stored data to the target in the clock cycle of the target, and the target still performs data reception in its own clock cycle. For the address/command bus (AXI AW), since the amount of data per cycle is small, the number of registers 422 may be one.

Similarly, in another example, when the AXI AW bus needs to transfer 128-bit data, a 16-bit byte mask and a 16-bit error correcting code (ECC) in one clock cycle, a total of 160 bits, a 22-bit wide 8-to-1 multiplexer 414 may be used in the initiator, and accordingly, a 22-bit wide 1-to-8 de-multiplexer 424 may be used in the target. Therefore, the transfer of a data flow from the initiator to the target in one clock cycle can be achieved, whereas the bit width of the 8-to-1 multiplexer 414 and the 1-to-8 de-multiplexer 424 is only 22 bits, and the data flow transfer of up to 176 bits can be supported, that is, the transfer of the 160-bit data flow can be achieved using only the bit width of 22 bits.

After the receiving state machine 423 confirms that the 8-to-1 de-multiplexer 421 transmits the received data flow to the first register 422, the receiving state machine 423 does not need to wait for the first register 422 to process the stored data and can immediately transmit the bus release flag (Awready) to the transmitting state machine 411, and the transmitting state machine 411 receiving the bus release flag can transmit the data through the 8-to-1 multiplexer 413 in the next clock cycle. Similarly, after the receiving state machine 426 determines that the 1-to-8 de-multiplexer 424 has transmitted the received data flow to the first register 425 or a second register 426, the receiving state machine 426 does not need to wait for the first register 425 or the second register 426 to process the stored data and can immediately transmit the bus release flag (not shown in the figure) to the transmitting state machine 412, and the transmitting state machine 412 receiving the bus release flag can transmit the data through the 8-to-1 multiplexer 414 in the next clock cycle.

The receiving state machine 423 may transmit the bus release flag to the transmitting state machine 411 through a side band bus, that is, the bus release flag des not be transmitted through the connection between the 8-to-1 multiplexer 413 and the 8-to-1 de-multiplexer 421. Similarly, the receiving state machine 426 may transmit the bus release flag to the transmitting state machine 412 through a side band bus, that is, the bus release flag des not be transmitted through the connection between the 8-to-1 multiplexer 414 and the 1-to-8 de-multiplexer 424.

The reason why at least two registers are set at the receiving end is that, since the transmitting state machine 412 can immediately transmit the data through the 8-to-1 multiplexer 414 upon receiving the bus release flag transmitted by the receiving state machine 426, the data stored in the first register 425 may not have been processed, and at this point, the 1-to-8 de-multiplexer 424 may store the data received again to the second register 427 that is idle. Each register transmits data to the target sequentially according to the reception sequence of the data. Generally, the continuous transfer of data can be achieved by setting two registers in the receiving end, but the number of registers in the receiving end can be determined according to the actual design requirements.

At least two registers in the receiving end 32 may be FIFO registers, that is, the data stored in the registers are output sequentially according to the reception sequence of the data. Each register includes two storage sections, one for storing the available state of the register and the other for storing data. As shown in FIG. 4, one part of the first register 422 is used for storing FIFO valid bits, and the other part is used for storing 48-bit AW data (1×48 FIFO AW). One part of the first register 425 is used for storing 8×1 FIFO valid bits, and the other part is used for storing 176-bit WT data (8×176 FIFO WT). One part of the second register 427 is used for storing 8×1 FIFO valid bits, and the other part is used for storing 176-bit WT data (8×176 FIFO WT). In addition, the register located on the AXI WT bus may also include a FIFO WT state machine for storing the state of the receiving state machine. The first register 425 and the second register 427 in FIG. 4 constitute a double Ping Pong FIFO.

Further, if at least two registers in the receiving end 32 are in a non-idle state, that is, if all registers in the receiving end 32 store data, the receiving end 32 cannot continue to receive data. At this point, the receiving state machine 426 can transmit a stall flag (Stall) to the transmitting state machine 412, and the transmitting state machine 412 stops transmitting the data flow from the transmitting chiplet through the 8-to-1 multiplexer 414 after the transmitting state machine 412 receives the stall flag. The receiving state machine can also transmit a stall flag to the transmitting state machine 414 through the side band bus.

Further, when the interconnect between chiplet simultaneously transmits a data bus and a command/address bus, that is, when the data transmitting bus of the transmitting chiplet is connected with the data receiving bus of the receiving chiplet through the bus pipeline structure, the transmitting command/address bus of the transmitting chiplet is connected with the receiving command/address bus of the receiving chiplet through the bus pipeline structure. Because the data bus does not transmit data every clock cycle and the amount of data to be transmitted needs to be larger than the amount of data transmitted on the address/command bus, after the transmitting state machine 412 of the bus pipeline structure through which the data transmitting bus of the transmitting chiplet is connected with the data receiving bus of the receiving chiplet receives the stall flag, the transmitting state machine 412 transmits the stall flag to the transmitting state machine 411 of the bus pipeline structure through which the transmitting command/address bus of the transmitting chiplet is connected with the receiving command/address bus of the receiving chiplet.

In addition, since the higher the clock frequency, the more difficult the design, the n-channel multiplexer may work in an n/2 times of clock domain of the transmitting chiplet, and at this point, the n-channel multiplexer adopts double clock data strobe processing. That is, the n-channel multiplexer performs corresponding processing on each rising edge and falling edge of the clock cycle, thereby reducing the clock frequency used by the n-channel multiplexer.

Figure 5:
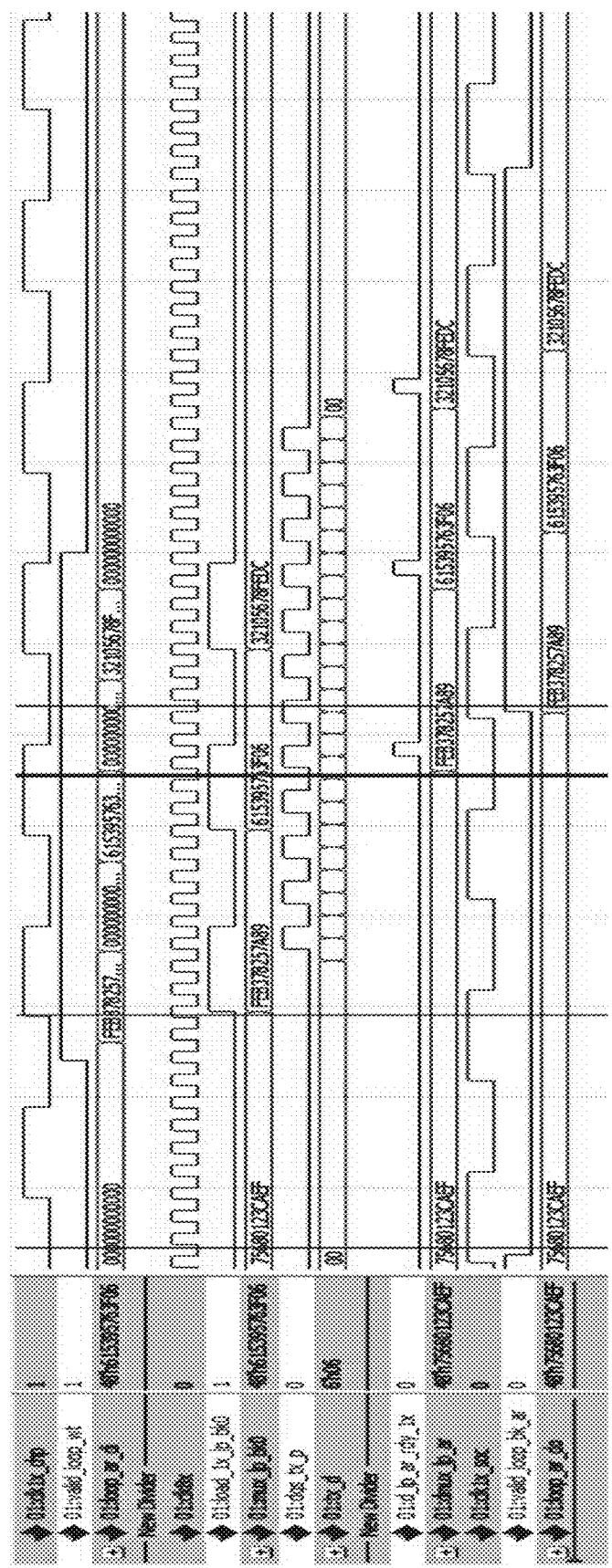
FIG. 5 is a schematic diagram of the simulated timing of data transfer between an n-channel multiplexer and an n-channel de-multiplexer in the bus pipeline structure for a die-to-die interconnect and chip according to an embodiment of the present application.

FIG. 5 is a schematic diagram of the simulated timing of data transfer between an n-channel multiplexer and an n-channel de-multiplexer in the bus pipeline structure for a die-to-die interconnect and chip according to an embodiment of the present application, where the bus pipeline structure for a die-to-die interconnect is shown in FIG. 4.

The timing in FIG. 5 shows that the D2D structure is clocked by two clk1x, one is at chiplet (clk1x_chp), and the other one is at the soc(clk1x_soc). These two clock shares the same frequency but in different clock phases because the two clocks are located in two different physical chiplets. In the chiplet, the 8-to-1 multiplexer starts to transmit the data at the assertion of signal "valid_loop_wt". FIG. 5 shows that the 8-to-1 multiplexer transmits h'FEB378257A89 at the first clock, h'61539576F06 at the second clock, and h'32105678FEDC at the third clock. Then the n-channel multiplexer uses a double clock data strobe, and DQS_TX_P toggles at 8× clock to transfer the serial data flow to the 1-to-8 de-multiplexer. The forward DQS_TX_P from the 8-to-1 multiplexer is used for strobing the serial data, and at this point, the 1-to-8 de-multiplexer performs 1-to-8 de-multiplexing. After de-multiplexing, the 1-to-8 de-multiplexer asserts a write data signal "d_1p_ar_rdy_1x" to FIFO. Once the data is stored in the FIFO, the FIFO will assert the signal "valid_loop_bk_ar" in the synchronous phase with 1× clock to SOC. This is how the 8-to-1 multiplexer and 1-to-8 de-multiplexer can complete the sequence of transmission and reception in the minimum latency, including the clock synchronization between D2D interconnect. This D2D interconnect does not require any software protocol. Different from UCIe/PCIe/USB operation which requires the software protocol, the latency for transmission and reception through the 8-to-1 multiplexer and 1-to-8 de-multiplexer is long.

Figure 6:
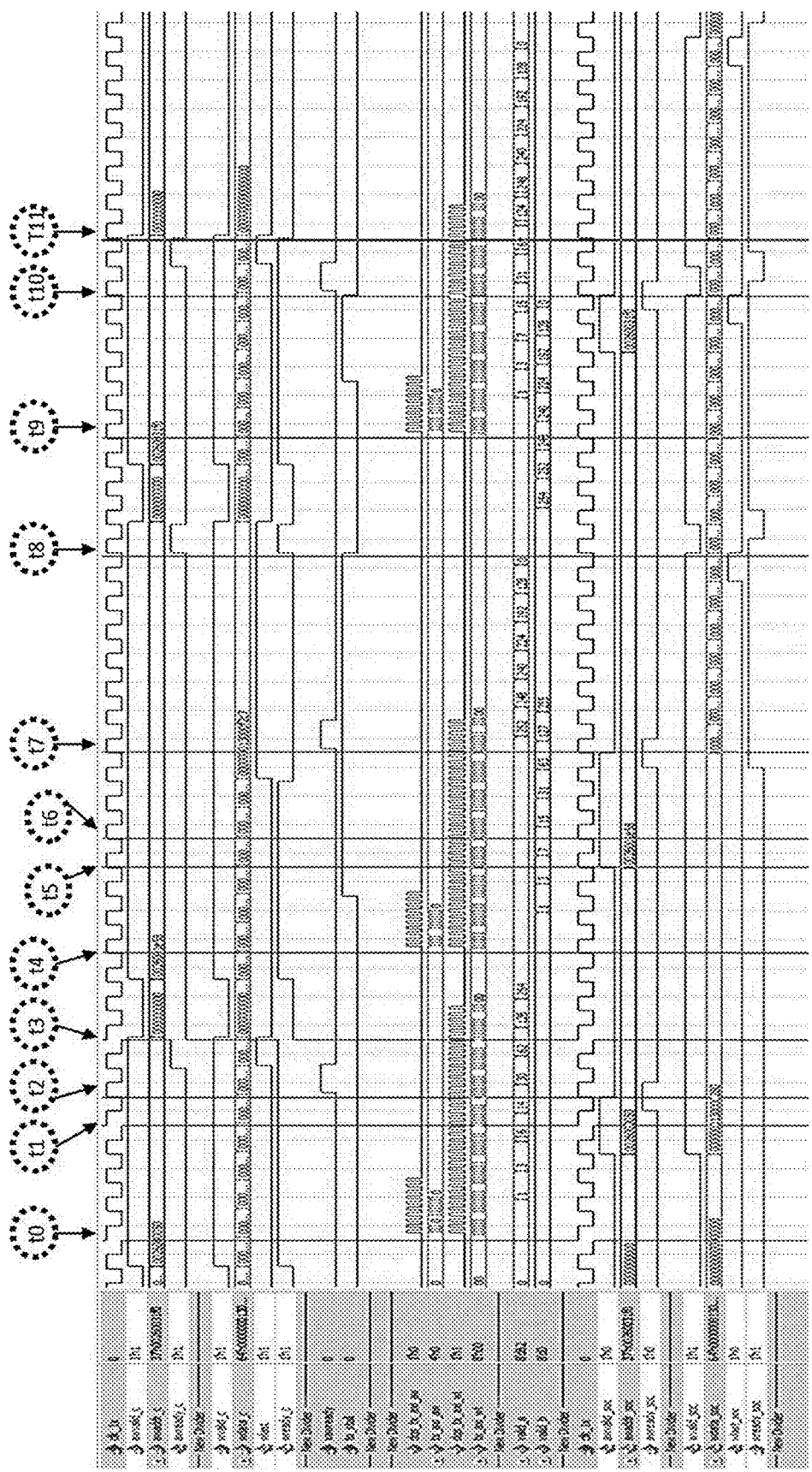
FIG. 6 is a schematic diagram of the complete transmission timing of a bus pipeline structure for a die-to-die interconnect according to an embodiment of the present application.

FIG. 6 is a schematic diagram of the complete transmission timing of a bus pipeline structure for a die-to-die interconnect according to an embodiment of the present application, where the bus pipeline structure for a die-to-die interconnect is shown in FIG. 4.

At timing of "t0" in FIG. 6, the chiplet working as a D2D initiator starts an AXI write cycle. The die-to-die interconnects will pass the AXI bus protocol from the chiplet to the system memory fabric, where the system memory fabric works as a D2D target. The preceding operation may also be completed in the short latency shown in FIG. 5. As shown in FIG. 4, the AXI bus signals are transferred though two concurrent sets of 8-to-1 multiplexer/1-to-8 de-multiplexer pairs, that is, AW (write address/command) and WT (the data for written). One set transfers the address and command and the other set transfer the write data. The chiplet write cycle is a burst transfer of 8 consecutive clocks without zero wait state. Therefore, FIG. 6 shows a longer series of DQS_TX_AXI_WT than that of DQS_TX_AXI_AW.

Between timing of "t0" and "t1", the 6-bit 8-to-1 multiplexer in the D2D initiator (in FIG. 4) transmits the address/command bus signals to the 6-bit 8-to-1 de-multiplexer. The address/command bus signals are stored into FIFO to be synchronized in the 1× clock domain so that the AXI_AW_Dec in the D2D target (in FIG. 4) can obtain the signals and asserts an AXI write address/command to the system fabric at timing "t1". While the address/command bus performs the transmission and reception, the data bus executes the same process through a 22-bit 1-to-8 multiplexer and a 22-bit 8-to-1 de-multiplexer. The data bus performs 8 consecutive burst transfer of 128-bit data/16-bit byte mask/16-bit ECC, and as a result, the 1-to-8 multiplexer and 8-to-1 de-multiplexer will take a longer transmission and reception time than the address/command bus shown in FIG. 6. At timing "t1", the AXI bus of the D2D target asserts the address/command bus and valid write data to the system memory fabric.

At timing "t2", the system memory fabric is able to take another request queue, that is, the system memory fabric asserts a signal of "awready_soc" to release the address/command bus. However, the system memory fabric cannot respond to the data bus due a long latency in the data bus. The long latency could be caused by various reasons such as busy in serving other memory masters or execution of a DRAM refresh cycle or just a long latency of a memory path. Therefore, the system memory fabric cannot respond to the first write data till timing "t7". Between timing "t0" and timing "t7", D2D already outstands two pending write cycles to the system memory fabric. At timing "t2", the AXI bus in the D2D target receives a bus release signal "awready_soc". The D2D target passes this signal through the side band bus without going through the multiplexer/de-multiplexer pair to the D2D initiator, as shown in FIG. 4. At timing "t3" shown in FIG. 6, the D2D initiator asserts bus release "awready_c" to the chiplet requesting another cycle. The preceding operation is performed after the D2D initiator receives a bus release request "Xawready" through the side band bus. At timing "t3", the chiplet also completes a burst data transfer from the D2D initiator to the D2D target. The preceding operation is concurrent to the command/address bus, and the data transfer is executed in the zero wait state. The data to be written to the memory fabric is stored in 8×176 FIFO_A, as shown in FIG. 4. However, the D2D target AXI write data bus cannot write data to the system memory fabric due the slow response in the system memory fabric. Those data in the FIFO will be remained as it is till the D2D target AXI can write data to the memory fabric. In this case, the FIFO A stores the data, as shown FIG. 6. The flag of "valid_a" changes from 0 to 254, indicating FIFO_A stores the write data. The "valid_b" in FIFO_B remains as 0, indicating no pending data stored at FIFO_B.

Since the D2D initiator releases the chiplet bus at "t3", at timing "t4", the chiplet starts to request another cycle execution even though the previous cycle is pending at D2D target FIFO_A and the memory fabric does not respond yet. At timing "t4", the D2D initiator starts to execute the transmission and reception through the two concurrent sets of 8-channel multiplexers and 8-channel de-multiplexers. Because FIFO_A remains for the previous pending cycle, the 8-to-1 de-multiplexer in the D2D target will use FIFO_B to store the data. Once FIFO_B is used, the valid_a will be no longer "0". The flag of "stall" will be asserted because both FIFOs are used. The "stall" is passed from the D2D target to the D2D initiator through the side band without going through 8-channel multiplexer/de-multiplexer pairs. The "stall" flag will stop the state machine in the D2D initiator from releasing the bus and from processing any pending cycle request in the chiplet.

At timing "t5", the flag of "stall" is asserted until one of the FIFOs is empty and is able to take another cycle request from the chiplet. At timing "t6", the AXI asserts a new command/address signal to the memory fabric. Therefore, the bus has two pending cycles to the memory fabric. There is no reason for the memory fabric to implement a big buffer size to obtain more request queues from the same master. As a result, the AXI bus in the D2D target is stalled because the memory fabric cannot occupy more pending cycles.

At timing "t7", the memory fabric is ready to respond to the first data that is stored in FIFO_A after a long latency. The memory fabric can release the bus and take another request once the memory fabric starts to respond to the pending data burst cycle from D2D FIFO_A. Therefore, at timing "t7", the memory fabric responds to the write data burst and at the same time releases the address/command bus by asserting "aweady_soc" to the D2D target. The D2D target passes the "awaready_soc" through side band to the D2D initiator to request the release of the chiplet bus and take other pending requests in the chiplet. However, both FIFO_A and FIFO_B are not empty yet. Therefore, the "stall" flag is still active because both FIFOs are not empty. The "stall" flag will mask out the "xawreay" asserted from the D2D target.

The chiplet bus will be remained uncompleted till timing "t8". At timing "t8", the memory fabric completes the last data from FIFO_A. Therefore, FIFO_A is empty after all data is updated to the memory fabric, and "valid_a" returns to 0. The flag "stall" becomes inactive, and this flag is passed to the D2D initiator. Once the D2D initiator receives the inactive "stall", the D2D initiator releases the chiplet bus to take a next pending cycle request if there is any.

At timing "t9", the chiplet issues another pending cycle request to the D2D target. The D2D target will execute the same operation and store the pending data in FIFO_A. The memory fabric has the capacity to respond to FIFO_B while FIFO_A takes the cycle request from the D2D initiator. At timing "t10", the memory fabric takes all data from FIFO_B and can release the bus to obtain another cycle request. The memory fabric can continue to respond to FIFO_A data stored in the D2D target. At timing "t11", the data in FIFO_A starts to be responded to.

As long as the memory fabric is able to respond to the D2D target, the D2D initiator can concurrently obtain the cycle request from the chiplet with available FIFO. The memory fabric can reach the high effective bandwidth shown in FIG. 6.

Figure 7:
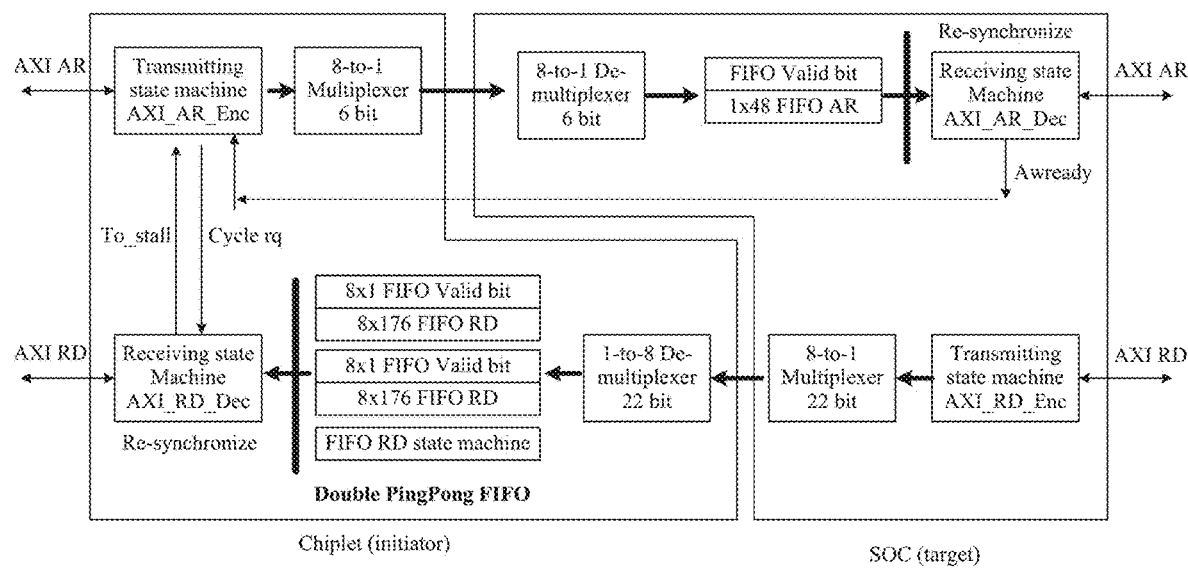
FIG. 7 is a structure diagram of yet another bus pipeline structure for a die-to-die interconnect according to an embodiment of the present application.

Based on the embodiments shown in FIGS. 3 to 6, the bus pipeline structure for a die-to-die interconnect provided by this embodiment of the present application may also be used on the AXI read bus, as shown in FIG. 7. FIG. 7 is a structure diagram of yet another bus pipeline structure for a die-to-die interconnect according to an embodiment of the present application.

FIG. 7 differs from FIG. 4 in that FIG. 7 shows a dis-to-die interconnect bus pipeline structure connected between an AXI read address bus (AXI AR) and an AXI read data bus (AXI RD). The chiplet works as the initiator to transmit a read address request to the SOC through the AXI AR bus, and the structure of the chiplet is similar to the structure on the AXI AW bus in FIG. 4. On the AXI RD bus, the SOC transmits the data requested by the chiplet to the chiplet. Therefore, the bus pipeline is in the direction from the SOC to the chiplet, and the structure of the bus pipeline on the AXI RD bus is similar to the structure of the bus pipeline structure on the AXI WT bus in FIG. 4 except that the direction on the bus pipeline is opposite to the direction on the AXI WT bus in FIG. 4. In FIG. 7, To_stall information is also transmitted directly from the receiving state machine on the AXI RD bus to the transmitting state machine on the AXI AR bus. The transmitting state machine on the AXI AR bus can also transmit a cycle request (Cycle rq) to the receiving state machine on the AXI RD bus to ask if data can be transmitted in the next cycle.

The bus pipeline structure for a die-to-die interconnect provided by embodiments of the present application adopts multiplexer and de-multiplexer pairs to perform data transfer between chiplets so that the bus pipeline interconnect structure between chiplets is achieved, thereby achieving the high effective bandwidth between chiplets using a smaller actual bit width and avoiding high latency.

The embodiments of the present application further provide a chip. The chip includes at least two chiplets, where any two of the at least two chiplets are connected through the bus pipeline structure for a die-to-die interconnect in the embodiments shown in FIGS. 3 to 7.

In general, the various embodiments of the present application may be implemented in hardware, a special-purpose circuit, software, logic or any combination thereof. For example, some aspects may be implemented in hardware while other aspects may be implemented in firmware or software that may be performed by a controller, a microprocessor or other computing devices, although the present application is not limited thereto.

The embodiments of the present application may be implemented by computer program instructions executable by a data processor of the mobile device, such as in a processor entity, or by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

The blocks of any logic flow in the drawings of the present application may represent program steps, or interconnected logic circuits, blocks and functions, or a combination of program steps and logic circuits, blocks and functions. The computer program may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital video disc (DVD) or a compact disc (CD)). The computer-readable medium may include a non-transitory storage medium. The data processor may be in any type suitable for the local technical environment, for example, but not limited to, a general-purpose computer, a special-purpose computer, a microprocessor, digital signal processing (DSP), an application-specific integrated circuit (ASIC), a field-programmable gate array (FPGA) and a processor based on multi-core processor architecture.

What is claimed is:

1. A bus pipeline structure for a die-to-die interconnect, comprising: a transmitting end and a receiving end; wherein
the transmitting end comprises a transmitting state machine and an n-channel multiplexer, and the receiving end comprises an n-channel de-multiplexer, at least two registers and a receiving state machine, wherein n is greater than or equal to 2, and the n-channel multiplexer is connected with the n-channel de-multiplexer;
the transmitting state machine is connected with a transmitting bus of a transmitting chiplet and works in a clock domain of the transmitting chiplet, the n-channel multiplexer works in an n times of the clock domain of the transmitting chiplet, the receiving state machine is connected with a receiving bus of a receiving chiplet, and the receiving end works in a clock domain of the receiving chiplet;

the transmitting state machine is connected with the n-channel multiplexer and is configured to control the n-channel multiplexer to transmit a data flow from the transmitting chiplet to the n-channel de-multiplexer, the n-channel de-multiplexer is configured to input the data flow received into a first register in an idle state among the at least two registers, and the first register is configured to output the received data flow to the receiving chiplet through the receiving state machine; and after the receiving state machine determines that the n-channel de-multiplexer has transmitted the received data flow to the first register, the receiving state machine is configured to transmit a bus release flag to the transmitting state machine, and after receiving the bus release flag, the transmitting state machine is configured to control the n-channel multiplexer to transmit the data flow from the transmitting chiplet to the n-channel de-multiplexer in a next clock cycle, wherein each of the transmitting bus, and the receiving bus is a data buses and command/address buses; and a data transmitting bus of the transmitting chiplet is connected with a data receiving bus of the receiving chiplet through the bus pipeline structure, and a transmitting command/address bus of the transmitting chiplet is connected with a receiving command/address bus of the receiving chiplet through the bus pipeline structure.

2. The bus pipeline structure according to claim 1, wherein the receiving state machine is configured to transmit the bus release flag to the transmitting state machine through a side band bus.

3. The bus pipeline structure according to claim 1, wherein the receiving state machine is further configured to transmit a stall flag to the transmitting state machine in a case where the at least two registers are all in a non-idle state, and the transmitting state machine is configured to stop transmitting the data flow from the transmitting chiplet through the n-channel multiplexer after the transmitting state machine receives the stall flag.

4. The bus pipeline structure according to claim 3, wherein the receiving state machine is configured to transmit the stall flag to the transmitting state machine through the side band bus in a case where the at least two registers are in the non-idle state.

5. The bus pipeline structure according to claim 1, wherein each of the transmitting bus and the receiving bus is a data bus or, a command/address bus.

6. The bus pipeline structure according to claim 1, wherein after the transmitting state machine of the bus pipeline structure through which the data transmitting bus of the transmitting chiplet is connected with the data receiving bus of the receiving chiplet receives the stall flag, the transmitting state machine of the bus pipeline structure through which the data transmitting bus of the transmitting chiplet is connected with the data receiving bus of the receiving chiplet transmits the stall flag to the transmitting state machine of the bus pipeline structure through which the transmitting command/address bus of the transmitting chiplet is connected with the receiving command/address bus of the receiving chiplet.

7. The bus pipeline structure according to claim 1, wherein a bit width of the n-channel multiplexer and a bit width of the n-channel de-multiplexer are both m, and m×n is greater than or equal to a length of a data flow transmitted by the transmitting bus of the transmitting chiplet to the receiving bus of the receiving chiplet in one clock cycle.

8. The bus pipeline structure according to claim 1, wherein the at least two registers are first in first out (FIFO) registers.

9. The bus pipeline structure according to claim 1, wherein the n-channel multiplexer works in an n/2 times of the clock domain of the transmitting chiplet, and the n-channel multiplexer adopts double clock data strobe processing.

10. A chip, comprising at least two chiplets, wherein two of the at least two chiplets are connected through a bus pipeline structure for the die-to-die interconnect, wherein the bus pipeline structure comprises: a transmitting end and a receiving end; wherein the transmitting end comprises a transmitting state machine and an n-channel multiplexer, and the receiving end comprises an n-channel de-multiplexer, at least two registers and a receiving state machine, wherein n is greater than or equal to 2, and the n-channel multiplexer is connected with the n-channel de-multiplexer;

the transmitting state machine is connected with a transmitting bus of a transmitting chiplet and works in a clock domain of the transmitting chiplet, the n-channel multiplexer works in an n times of the clock domain of the transmitting chiplet, the receiving state machine is connected with a receiving bus of a receiving chiplet, and the receiving end works in a clock domain of the receiving chiplet;

the transmitting state machine is connected with the n-channel multiplexer and is configured to control the n-channel multiplexer to transmit a data flow from the transmitting chiplet to the n-channel de-multiplexer, the n-channel de-multiplexer is configured to input the data flow received into a first register in an idle state among the at least two registers, and the first register is configured to output the received data flow to the receiving chiplet through the receiving state machine; and after the receiving state machine determines that the n-channel de-multiplexer has transmitted the received data flow to the first register, the receiving state machine is configured to transmit a bus release flag to the transmitting state machine, and after receiving the bus release flag, the transmitting state machine is configured to control the n-channel multiplexer to transmit the data flow from the transmitting chiplet to the n-channel de-multiplexer in a next clock cycle, wherein each of the transmitting bus and the receiving bus is a data buses and command/address buses; and a data transmitting bus of the transmitting chiplet is connected with a data receiving bus of the receiving chiplet through the bus pipeline structure, and a transmitting command/address bus of the transmitting chiplet is connected with a receiving command/address bus of the receiving chiplet through the bus pipeline structure.

11. The chip according to claim 10, wherein the receiving state machine is configured to transmit the bus release flag to the transmitting state machine through a side band bus.

12. The chip according to claim 10, wherein the receiving state machine is further configured to transmit a stall flag to the transmitting state machine in a case where the at least two registers are all in a non-idle state, and the transmitting state machine is configured to stop transmitting the data flow from the transmitting chiplet through the n-channel multiplexer after the transmitting state machine receives the stall flag.

13. The chip according to claim 12, wherein the receiving state machine is configured to transmit the stall flag to the transmitting state machine through the side band bus in a case where the at least two registers are in the non-idle state.

14. The chip according to claim 10, wherein each of the transmitting bus and the receiving bus is a data bus or, a command/address bus.

15. The chip according to claim 10, wherein after the transmitting state machine of the bus pipeline structure through which the data transmitting bus of the transmitting chiplet is connected with the data receiving bus of the receiving chiplet receives the stall flag, the transmitting state machine of the bus pipeline structure through which the data transmitting bus of the transmitting chiplet is connected with the data receiving bus of the receiving chiplet transmits the stall flag to the transmitting state machine of the bus pipeline structure through which the transmitting command/address bus of the transmitting chiplet is connected with the receiving command/address bus of the receiving chiplet.

16. The chip according to claim 10, wherein a bit width of the n-channel multiplexer and a bit width of the n-channel de-multiplexer are both m, and m×n is greater than or equal to a length of a data flow transmitted by the transmitting bus of the transmitting chiplet to the receiving bus of the receiving chiplet in one clock cycle.

17. The chip according to claim 10, wherein the at least two registers are first in first out (FIFO) registers.

18. The chip according to claim 10, wherein the n-channel multiplexer works in an n/2 times of the clock domain of the transmitting chiplet, and the n-channel multiplexer adopts double clock data strobe processing.

* * * * *